(12) United States Patent
Morise

(10) Patent No.: US 9,074,702 B2
(45) Date of Patent: Jul. 7, 2015

(54) FLOW CONTROL VALVE

(75) Inventor: Masaru Morise, Nukata-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 566 days.

(21) Appl. No.: 13/319,846

(22) PCT Filed: Jun. 30, 2009

(86) PCT No.: PCT/JP2009/062017
§ 371 (c)(1),
(2), (4) Date: Nov. 10, 2011

(87) PCT Pub. No.: WO2010/134216
PCT Pub. Date: Nov. 25, 2010

(65) Prior Publication Data
US 2012/0049097 A1      Mar. 1, 2012

(30) Foreign Application Priority Data

May 18, 2009   (JP) ................................ 2009-119771

(51) Int. Cl.
*F16K 11/07*       (2006.01)
*F16K 31/06*       (2006.01)

(52) U.S. Cl.
CPC ......... *F16K 31/0686* (2013.01); *F16K 31/0613* (2013.01)

(58) Field of Classification Search
CPC ............ F16K 31/0693; F16K 31/0696; F16K 31/0613; F16K 31/0655; F16K 31/0689; F16K 47/023; F16K 31/0686; G05D 16/2086; F16F 5/00
USPC ............. 137/625.65, 625.69, 625.48, 596.17; 251/48, 50, 53, 49, 51, 52, 54, 55
See application file for complete search history.

(56) References Cited

U.S. PATENT DOCUMENTS 4,669,504 A      6/1987    Fujitsugu et al.
4,838,518 A  *   6/1989    Kobayashi et al. ...... 137/625.65
(Continued)

FOREIGN PATENT DOCUMENTS

DE         198 29 549 A1    12/1999
EP         1 323 963 A2      7/2003
(Continued)

OTHER PUBLICATIONS

International Search Report dated Jul. 28, 2009 in International Application No. PCT/JP2009/062017 (with translation).
(Continued)

*Primary Examiner* — Craig Schneider
*Assistant Examiner* — Craig J Price
(74) *Attorney, Agent, or Firm* — Oliff PLC

(57) ABSTRACT

A linear type flow control valve includes a spool valve element fitted in a valve housing, and having a characteristic of an output flow rate such that a positive output flow rate increases after a negative output flow rate decreases toward zero and pass a neutral point on which the output flow is zero with an increase of the shifting stroke of the spool valve element. The flow control valve includes a damper chamber and a restricting section. The restricting section forms a restricting flow passage having a larger flowing cross-sectional area of the working fluid when the spool valve element assumes a shift position on a positive output flow rate side of the neutral point of the spool valve element than that when the spool valve element assumes a shift position on a negative output flow rate side.

14 Claims, 3 Drawing Sheets

(56) References Cited

U.S. PATENT DOCUMENTS

| | | | |
|---|---|---|---|
| 5,191,827 A * | 3/1993 | Kervagoret | 91/433 |
| 6,948,514 B1 | 9/2005 | Kramer et al. | |
| 8,104,739 B2 * | 1/2012 | Vollmer et al. | 251/50 |
| 8,662,097 B2 * | 3/2014 | Imhof et al. | 137/115.1 |
| 8,819,895 B2 * | 9/2014 | Bienek | 16/53 |
| 2006/0081298 A1 | 4/2006 | Segi et al. | |
| 2007/0158603 A1 | 7/2007 | Vollmer et al. | |

FOREIGN PATENT DOCUMENTS

| | | |
|---|---|---|
| JP | A-53-77425 | 6/1978 |
| JP | U-53-139631 | 11/1978 |
| JP | U-54-151826 | 10/1979 |
| JP | U-61-99771 | 6/1986 |
| JP | A-61228176 | 10/1986 |
| JP | U-61-182474 | 11/1986 |
| JP | A-5-164223 | 6/1993 |
| JP | A-2005-273912 | 10/2005 |
| JP | A-2006-112514 | 4/2006 |
| JP | A-2008-157270 | 7/2008 |
| WO | WO 2006/000526 A1 | 1/2006 |

OTHER PUBLICATIONS

May 7, 2013 Notification of Reasons for Rejection issued in Japanese Patent Application No. 2009-119771 (with translation).

* cited by examiner

FLOW CONTROL VALVE

FIELD OF THE INVENTION

This invention relates to a linear type flow control valve for controlling the flow rate of working fluid depending on a shift position of a spool valve element.

BACKGROUND OF THE INVENTION

Flow control valves have been well known wherein working fluid is controlled depending on movements (sliding movements) of a spool valve disposed in a valve housing for reciprocating moving (reciprocating sliding) capability along one axis thereof to vary, for instance, a pressure, a flow rate and a flow passage, etc., of working fluid. For instance, a hydraulic control valve, disclosed in Patent Publication 1, and electromagnetic valves for hydraulic control valves, disclosed in Patent Publications 2 to 4, correspond to such technologies. With such flow control valves, a hydrodynamic force of fluid, admitted through, for instance, an inlet port, acts on the spool valve element in an axial direction thereof. This results in the occurrence of an unstable balance with a likelihood of causing the spool valve element to oscillate. On the contrary, for instance, Patent Publication 1 discloses the hydraulic control valve having an oil chamber, opened to the atmosphere at a position where working oil inflows or outflows due to the shifting movement of the spool valve element, and a restricting element (orifice) disposed between the oil chamber and a portion to introduce working oil. This enables a damping (braking and attenuating) of an oil flow during the shifting movement of the spool valve element for thereby absorbing (attenuating and suppressing) the oscillation of the spool valve element during a pressure regulating mode.

PUBLICATIONS ON PRIOR ART

Patent Publications

Patent Publication 1: Japanese Patent Application Publication 5-164223
Patent Publication 2: Japanese Patent Application Publication 61-228176
Patent Publication 3: Japanese Patent Application Publication 61-99771
Patent Publication 4: Japanese Patent Application Publication 61-182474

SUMMARY OF THE INVENTION

Problems to be Solved by the Invention

Meanwhile, it is conceived that the spool valve element has likelihood to be susceptible to the occurrence of oscillation or to be less susceptible to the occurrence of oscillation depending on a position (which will be hereinafter referred to as "shift position (sliding position)") of the spool valve element during the shifting movement thereof. That is, the magnitude of oscillation of the spool valve element may conceivably vary depending on the shift position of the spool valve element. Therefore, providing the restricting element evenly having the same flow resistances (flow rates) regardless of the shift position of the spool valve element with a focus on, for instance, oscillation absorbing capability results in likelihood of causing an issue to arise with a drop in responsiveness owing to a relevant restricting action even at the shift position less susceptible to the occurrence of oscillation. On the contrary, evenly providing the restricting element regardless of the shift position of the spool valve element with a focus on, for instance, responsiveness results in likelihood of causing a difficulty of appropriately absorbing (attenuating) the oscillation at the shift position susceptible to the occurrence of oscillation. With, for instance, the flow control valve wherein a flowing direction of a fluid in an outlet port varies in opposite ways for inflow or outflow depending on the shift position of the spool valve element, particularly, it is likely that the magnitude of oscillation remarkably varies depending on the shift position (a reverse in flow direction of the fluid depending on, for instance, the shift position) of the spool valve element and such an issue becomes remarkable. No attempt has been done yet to provide a compromise between responsiveness of the spool valve element during the shifting movement thereof and suppression of oscillation of the spool valve element.

The present invention has been completed with the above view in mind and has an object to provide a flow control valve that can have a compromise between responsiveness of the spool valve element during the shifting movement thereof and suppression of oscillation of the spool valve element.

BEST MODE FOR CARRYING OUT THE INVENTION

The object indicated above can be achieved according to a first aspect of the present invention, which provides a linear type flow control valve includes a spool valve element fitted in a valve housing for reciprocating movement capability along one axis for controlling a flow rate of working fluid depending on a shift position of the spool valve element; the flow control valve including a damper chamber, variable in volume depending on shifting movement of the spool valve element, and a restricting section for controlling an inflow and outflow of working fluid into or out of the damper chamber in the valve housing; and the restricting section forming a restricting flow passage in different flowing cross-sectional areas, through which the working fluid flows into or flows out of the damper chamber, depending on a difference in the shift position of the spool valve element.

Accordingly, the linear solenoid valve has the valve housing in which the damper chamber and the restricting section are provided. With the restricting section, the restricting flow passage is formed in different flowing cross-sectional areas through which working fluid flows into or flows out of the damper chamber depending on a difference in the shift position of the spool valve element. This suppresses the oscillation of the spool valve element owing to the damper chamber and the restricting section. In addition, flow resistance (flow rate) of the damper chamber is altered depending on the shift position of the spool valve element. That is, the spool valve element has low responsiveness during shifting movement of the spool valve element depending on the shift position with an increase in an oscillation suppressing effect of the spool valve element. Moreover, although the spool valve element has a decreasing oscillation suppressing effect on the spool valve element, a drop in responsiveness of the spool valve element during shifting movement of the spool valve element can be suppressed. Consequently, it becomes possible to have a compatibility between responsiveness of the spool valve element during shifting movement thereof and suppressive oscillation (oscillation-proof) of the spool valve element when subjected to a likelihood susceptible to oscillation of the spool valve element and a likelihood less susceptible to oscillation of the spool valve element depending on the shift position of the spool valve element. Thus, this decreases a region (the operating region (moving range) of the spool valve element), sacrificing responsiveness of the spool valve element during shifting movement thereof, to be as small as possible, while appropriately ensuring the oscillation suppressing effect of the spool valve element depending on needs.

Preferably, when the spool valve element assumes a shift position in which the spool valve element oscillates with large amplitude, the restricting section allows the restricting flow passage to have a smaller flowing cross-sectional area than that occurring when assuming the shift position in oscillation with small amplitude. Accordingly, when the spool valve element remained in the shift position at which the spool valve element is likely to oscillate, the restricting section increases flow resistance (flow rate) of working oil admitted to the damper chamber. This appropriately suppresses the oscillation of the spool valve element. When the spool valve element remained in the shift position at which the spool valve element is less likely to oscillate, the restricting section decreases flow resistance (flow rate) of working oil admitted to the damper chamber, thereby suppressing a drop in responsiveness during the shifting movement of the spool valve element.

Preferably, the restricting section forms: a first restricting flow passage during an operating region, among shifting strokes of the spool valve element, in which an amplitude of the oscillation of the spool valve element becomes large; and a second restricting flow passage during an operating region, among the shifting strokes of the spool valve element, in which the amplitude of the oscillation of the spool valve element becomes small, wherein a flowing cross-sectional area of the second restricting flow passage is smaller than that of the first restricting flow passage. Accordingly, when the spool valve element assumes the operating region liable to oscillate, the first restricting flow passage, formed by the restricting section, increases flow resistance (flow rate) of working oil admitted to the damper chamber such that the oscillation of the spool valve element, is appropriately suppressed. When the spool valve element assumes the other operating region less likely to oscillate, the second restricting flow passage, formed by the restricting section, decreases flow resistance (flow rate) of working oil admitted to the damper chamber to a level lower than that attained in the first restricting flow passage. This suppresses a drop in responsiveness during the shifting movement of the spool valve element.

Preferably, the damper chamber is provided in a cylindrical space formed between the spool valve element and an inner circumferential surface of the valve housing. Accordingly, no need arises for a specified area to be provided for the damper chamber and the damper chamber can be simply formed in the valve housing.

Preferably, the restricting section comprises a restriction ring, provided on the spool valve element and having a diameter larger than that of the spool valve element, and a portion of an inner circumferential surface of the valve housing in an area placed in opposition to the restriction ring in a radial direction. Accordingly, the restricting section, available to suppress the inflow and outflow of working fluid to and from the damper chamber, can be simply formed in the valve housing. That is, the restricting flow passage, available to pass working fluid to flow into or out of the damper chamber, can be simply formed in the valve housing.

Preferably, the flow control valve includes an electromagnetic valve including a linear solenoid driving the spool valve element in one direction along the one axis in response to an action of an electromagnetic force, and a return spring urging the spool valve element in a returning direction opposite to the one direction. The spool valve element has low responsiveness during shifting movement of the spool valve element depending on the shift position with an increase in an oscillation suppressing effect of the spool valve element. Moreover, although the spool valve element has a decreasing oscillation suppressing effect on the spool valve element, a drop in responsiveness of the spool valve element during shifting movement of the spool valve element can be suppressed. That is, in the aforementioned electromagnetic valve, it becomes possible to have a compatibility between responsiveness of the spool valve element during shifting movement thereof and suppressive oscillation (oscillation-proof) of the spool valve element when subjected to a likelihood susceptible to oscillation of the spool valve element and a likelihood less susceptible to oscillation of the spool valve element depending on the shift position of the spool valve element.

Preferably, the damper chamber and the restricting section are formed in a spring chamber in which the return spring is disposed. Accordingly, no need arises for specified areas to be provided for the damper chamber and the restricting section and the damper chamber and the restricting section can be simply formed in the valve housing.

Preferably, the valve housing includes: a supply port through which the working fluid is supplied; a drain port through which the working fluid is drained; and a control port through which the working fluid outgoes and inflows; wherein the spool valve element causes the drain port and the control port to communicate with each other during a first operating region between a neutral point of the shifting strokes and one end of the shifting strokes; the spool valve element causes the supply port and the control port to communicate with each other during a second operating region between the neutral point and the other end of the shifting strokes; and when the spool valve element is in the first operating region, the restricting section allows the restricting flow passage to have a flowing cross-sectional area lower than that occurring when the spool valve element is in the second operating region. Accordingly, when the spool valve element assumes, for instance, the first operating region liable to cause the occurrence of oscillation, the restricting section causes flow resistance (flow rate) of working oil admitted to the damper chamber to increase such that the oscillation of the spool valve element is appropriately suppressed. When the spool valve element assumes, for instance, the second operating region less liable to cause the occurrence of oscillation, the restricting section causes flow resistance (flow rate) of working oil admitted to the damper chamber to decrease, thereby suppressing a drop in responsiveness of the spool valve element during shifting movement thereof.

Preferably, the flow control valve includes an electromagnetic valve including a linear solenoid driving the spool valve element in one direction along the one axis in response to an action of an electromagnetic force, and a return spring urging the spool valve element in a returning direction opposite to the one direction; wherein the damper chamber and the restricting section are formed in a spring chamber in which the return spring is disposed; the damper chamber is provided in a cylindrical space formed between an axial end portion of the spool valve element disposed in the spring chamber, and the valve housing; and the restricting section comprises a restriction ring, larger in diameter than the axial end portion of the spool valve element, and an opposite inner circumferential surface of inner circumferential surfaces of the valve housing placed in opposition to the restriction ring in a radial direction. This allows a general electromagnetic valve having a linear solenoid and a return spring has no need to prepare specified areas for the damper chamber and the restricting section can be simply formed in the spring chamber.

Preferably, the damper chamber is provided in a cylindrical space formed in the spring chamber between the axial end portion of the spool valve element and the inner circumferential surface of the valve housing, and wherein the inner circumferential surface has a diameter larger than a sliding inner circumferential surface of the valve housing held in sliding engagement with a land of the spool valve element during shifting movement of the spool valve element. Accordingly, a cylindrical space is appropriately formed to serve as the damper oil chamber between the inner circumferential surface and the axial end portion of the spool valve element by an extent in that the inner circumferential surface is greater in diameter than the sliding inner circumferential surface.

Preferably, when the spool valve element is in the first operating region, the restricting section forms a first restricting flow passage between the restriction ring and a first opposite inner circumferential surface of the opposite inner circumferential surfaces; and when the spool valve element is in the second operating region, the restricting section forms a second restricting flow passage, having a flowing cross-sectional area greater than that of the first restricting flow passage, between the restriction ring and a second opposite inner circumferential surface of the opposite inner circumferential surface having a diameter larger than the first opposite inner circumferential surface. Accordingly, when the spool valve element is in, for instance, the first operating region liable to cause the occurrence of oscillation, the first restricting flow passage, formed in the restricting section, causes oil resistance (flow rate) of working fluid admitted to the damper chamber to increase when the oscillation of the spool valve element is reduced suitably. In contrast, when the spool valve element is in, for instance, the second operating region less liable to cause the occurrence of oscillation, the second restricting flow passage, formed in the restricting section, causes oil resistance (flow rate) of working fluid admitted to the damper chamber to decrease, thus a drop in responsiveness is suppressed during the shifting movement of the spool valve element. In addition, the first restricting flow passage and the second restricting flow passage are simply defined with the first opposite inner circumferential surface and the second opposite inner circumferential surface within spring chamber.

Preferably, a linear type flow control valve used for flow control of the working fluid (gas, liquid) is, for instance, a linear solenoid valve 10 used for controlling the flow rate of working oil serving as a working fluid for actuating hydraulic equipment (such as, for instance, a hydraulic servo valve) related to gear shifting of an automatic power transmission of a vehicle.

BEST MODE FOR CARRYING OUT THE INVENTION

Now, embodiments of the present invention will be described below in detail with reference to the accompanying drawings.

Embodiment

Figure 1:
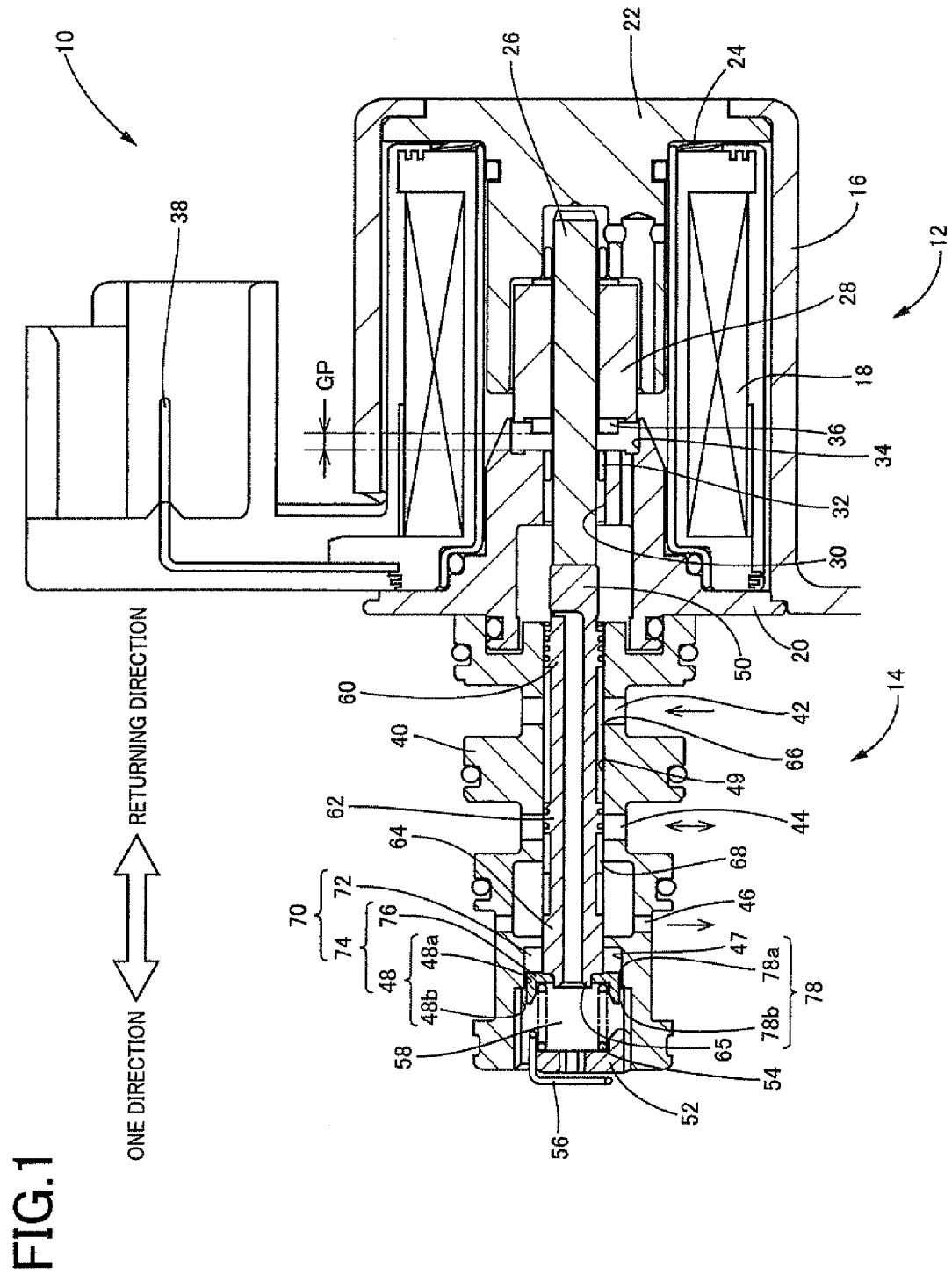
FIG. 1 is a cross-sectional view explaining the structure of a linear solenoid valve that is an electromagnetic valve representing one embodiment to which the present invention is applied.

FIG. 1 is a cross-sectional view of an electromagnetic valve representing one embodiment of a linear-type flow control valve to which the present invention is applied. The electromagnetic valve is shown in the form of a linear solenoid valve 10 used for controlling the flow rate of working oil serving as a working fluid for actuating hydraulic equipment (such as, for instance, a hydraulic servo valve) related to gear shifting of, for instance, an automatic power transmission of a vehicle. The linear solenoid valve 10 includes: a linear solenoid section 12 for electromagnetically generating a solenoid thrust $F_1$ at a magnitude depending on a drive current I delivered from a control device (not shown); and a valve section 14 for outputting the flow rate Q of the working fluid at the magnitude depending on the drive current I in response to the solenoid thrust force $F_1$.

The linear solenoid section 12 includes: a cylindrical linear solenoid 18 accommodated in a cylindrical yoke 16 at a concentric position; a core member 20 fitted to the yoke 16 at an end portion thereof in an area closer to the valve section 14 of the yoke 16; a nearly cylindrical cover member 22 fitted to the yoke 16 at the other end thereof in a position opposite to the valve section 14 such that an opening of the other end is closed; a disk-shaped spring 24 disposed between the linear solenoid 18 and the cover member 22 for pressing the linear solenoid 18 against the core member 20; and a cylindrical plunger 28 moveably fitted in an inner circumferential surface of the cover member 22 at one end thereof and having a columnar shaft 26 axially protruding outward at both ends thereof. The core member 20 has an axially extending through-hole 30. The shaft 26 is moveably fitted in a guide bush 32 fitted to the through-hole 30 such that the plunger 28 has an outer circumference provided with a slight amount of clearance to be moveably supported in an axial direction, i.e., in a longitudinal direction thereof. In addition, the core member 20 has a bore 34 to receive the other end of the plunger 28. A stopper 26 is fixedly provided on the plunger 28 in an opposing surface (at an end face) between the plunger 28 and the guide bush 32 for abutting engagement with a bottom wall surface of the bore 34 with a view to blocking a further approach of the plunger 28 in excess with the other end of the plunger 28 nearly fitted in the bore 34. During non-excitation of the linear solenoid 18, accordingly, a gap GP between the bottom surface of the bore 34 and the stopper 36 corresponds to a maximal shifting amount of the plunger 28 i.e., a maximal shifting amount Xmax of a spool valve element 50 explained later.

The valve section 14 includes: a nearly cylindrical valve housing 40 fixedly secured to the core member 20; the spool valve element 50 fitted to the valve housing 40 in abutting engagement with the shaft 26 to be moveable for reciprocating movement capability (for reciprocating and sliding capability) along one axis in concentric relation thereto; a lid body 52 screwed into and mounted onto the linear valve housing 40 at one end thereof in opposition to the linear solenoid section 12; a return spring 54 disposed in the spool valve element 50 in a coaxial relation thereto and urging the spool valve element 50 such that it is brought into abutting contact with the shaft 26; and a whirl-stop 56 for stopping the rotation of the lid body 52 to be fixed in place.

The return spring 54 is received in a spring oil chamber 58 which serves as a spring chamber defined between the spool valve element 50 and the lid body 52 to act as a space of the housing 40 in an area closer to the lid body 52. The spring oil chamber 58 communicates with, for instance, an oil sump (not shown) opening to the atmosphere outside the valve housing 40 such that the spring oil chamber 58 is filled with working oil.

The valve housing 40 is formed with: a supply port 42 serving as an input port for supplying, for instance, a line oil pressure; a control port 44 serving as an output port through which working fluid, supplied to the supply port 42, flows out to, for instance, hydraulic equipment (hydraulic servo) (not shown) while permitting working oil to flow from the hydraulic equipment (hydraulic servo); and a drain port 46 though which working oil, input to the control port 44 from hydraulic equipment, is caused to drain (discharged) into the oil sump opening to, for instance, the atmosphere. Further, the spool valve element 50 has, in an order from the linear solenoid section 12, a first land 60, a second land 62 and a third land 64 all of which are formed in, for instance, the same diameter. In addition, a space between the first and second lands 60 and 62 serves as a supply oil passage 66 functioning as a hydraulic passage in communication with the supply port 42 and the control port 44. A space between the second and third lands 62 and 64 serves as a drain oil passage 68 functioning as a hydraulic passage in communication with the control port 44 and the drain port 46.

Figure 2:
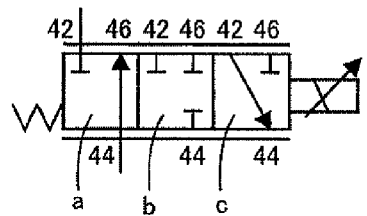
FIG. 2 illustrates a graphic symbol for the linear solenoid valve in FIG. 1.

With the linear solenoid valve 10 formed in such a structure, the flow of working oil is switched depending on a shift position of the spool valve element 50 in a manner as indicated by, for instance, graphic symbols for hydraulic systems in FIG. 2. This results in control of the flow rate Q of working oil passing through the control port 44 depending on a shifting amount (the amount of sliding movement) X of the spool valve element 50 operating in response to a drive current I supplied to the linear solenoid 18 as shown in FIG. 3.

More particularly, when the drive current I is zero, i.e., during non-excitation of the linear solenoid 18, the urging force $F_s$ of the return spring 54 causes the spool valve element 50 to assume (be in) a position closest to the linear solenoid section 12. This position will be assigned to "an original position" (under a state shown in FIG. 1) of the spool valve element 50. With the spool valve element 50 placed in the original position, the flow of working oil from the supply port 42 to the control port 44 is interrupted. In this moment, the flow of working oil is established causing working oil delivered from, for instance, hydraulic equipment to the control port 44 to be input to the control port 44 after which working oil is discharged from the drain port 46 via the drain oil passage 68 (see a state "a" in FIG. 2). Assume that working oil, output from the control port 44 to hydraulic equipment, has a flowing direction at the flow rate Q on a positive side, the flow rate Q in the original position is assigned to have the maximum flow rate Qmax− on, for instance, a negative side.

Meanwhile, when the linear solenoid 18 is excited upon receipt of the drive current I applied to the terminal 38 of the linear solenoid 18, the linear solenoid 18 generates a magnetic suction force, i.e., an electromagnetic force in a direction to minimize the gap G. Thus, linear solenoid 18 generates a solenoid thrust $F_I (=f(I))$ at a magnitude depending on the drive current I such that the plunger 28, freely moveably supported in the axial direction, is driven in one direction (that is, in a direction toward the valve section 14) along the center axis (that is, in one axis noted above). This allows the shaft 26 to drive the spool valve element 50 in the one direction noted above in response to the action caused by the electromagnetic force mentioned above. The shifting amount X of the spool valve element 50 relative to the original position varies in proportion to, for instance, the drive current I applied to the linear solenoid 18 (see FIG. 3). As the drive current I, applied to the linear solenoid 18, is caused to gradually increase from zero, the spool valve element 50 is caused to move in the one direction noted above depending on such an increase. When this takes place, the flow rate Q of working oil in the control port 44 is caused to gradually vary from the maximum flow rate Qmax− to the zeroed flow rate on the negative side.

Then, the spool valve element 50 is caused to move in the one direction, noted above, until the shift position of the spool valve element 50 in which the second land 62 closes the control port 44. This interrupts the flow of working oil from the supply port 42 to the control port 44, while additionally interrupting the flow of working oil from the control port 44 to the drain port 46 (see a state "b" in FIG. 2). Accordingly, the flow rate Q of working oil in the control port 44 is regarded to be zero (nearly zero in consideration of the amount of leakage or the like) at this time. In the present embodiment, the drive current I (i.e., the shifting amount X representing the shift position of the spool valve element 50), when the flow rate Q is zero, will be referred to as a "null point N" (i.e., a zeroed flow point representing a neutral point). However, the shift position of the spool valve element 50, at which the flow rate Q is regarded to be zero, falls in a predetermined range depending on an axial thickness of, for instance, the second land 62. Thus, the null point N may be set to be, for instance, a center point of such a predetermined range. Moreover, the predetermined range, in which the flow rate Q is regarded to be zero, may be desirably preset depending on characteristics of the desired flow rate Q, for instance, the axial thickness of the second land 62.

As the drive current I, applied to the linear solenoid 18, gradually increases from the null point N, the spool valve element 50 is caused to move further in the one direction noted above. This causes a flow of working oil to be established under which, for instance, working oil, admitted to the supply port 42, flows through the supply oil passage 66 into the control port 44 for delivery to hydraulic equipment as set forth above (see a state "c" in FIG. 2) with the flow of working oil from the control port 44 to the drain port 46 remained interrupted. When this takes place, the flow rate Q of working oil passing through the control port 44 is caused to gradually increase from the null point N toward the maximum flow rate Qmax+ on a positive side depending on the presence of the drive current I, applied to the linear solenoid 18, gradually increasing from the zeroed flow rate. Then, the flow rate Q, at which the shifting amount X of the spool valve element 50 reaches the maximum shifting amount Xmax, is regarded to be, for instance, the maximum flow rate Qmax+ on the positive side.

Thus, the shifting stroke of the spool valve element 50 falls in an operating region (moving range) of the spool valve element 50 between the original position acting as, for instance, one end of the shifting stroke and the maximum shift position acting as the other end of the shifting stroke. The null point N also serves as a neutral point of the shifting stroke of the spool valve element 50. Accordingly, the spool valve element 50 assumes: a first operating region between the neutral point of the shifting stroke and the original position in which the drain port 46 and the control port 44 are brought into fluid communication with each other; and a second operating region between the neutral point of the shifting stroke and the maximum shift position in which the supply port 42 and the control port 44 are brought into fluid communication with each other. In addition, the return spring 54 serves to urge the spool valve element 50 in a return direction opposite to the one direction described above such that the spool valve element 50 moves in the return direction with the occurrence of non-excitation of the linear solenoid 18. That is, the return spring 54 applies the urging force $F_s$ onto the spool valve element 50 in the return direction, and the solenoid thrust $F_1$ is applied by the linear solenoid section 12 via the shaft 26 in the one direction. In addition, the plunger 28 is supported to be axially moveable with a slight amount of clearance being formed on the outer periphery of the plunger 28 but it may be preferable for such a clearance to be formed as small as possible for the purpose of increasing a driving efficiency.

Here, with the linear solenoid valve 10 of the present embodiment, there is a likelihood in that a hydrodynamic force of working oil, admitted from, for instance, the supply port 42 and the control port 44, is applied to the spool valve element 50 in the axial direction thereof with a resultant occurrence of oscillation of the spool valve element 50. Therefore, the linear solenoid valve 10 of the present embodiment includes a damper section 70 that is disposed in the valve housing 40 to suppress the oscillation of the spool valve element 50. The damper section 70 includes a damper oil chamber 72, serving as a damper chamber causing a volume to vary depending on the shifting movement of the spool valve element 50, and a restricting section 74 for suppressing the inflow or outflow of working oil into or out of the damper oil chamber 72. The damper section 70 is incorporated inside the valve housing 40 and formed in, for instance, the spring chamber 58.

The damper oil chamber 72 takes the form of a cylindrical space that is defined between the third land 64 of the spool valve element 50, a part of which is disposed in the spring oil chamber 58 and acts as a shaft end portion closer to the return spring 54, and the inner circumferential surface 47 of the spring oil chamber 58 of the valve housing 40. The inner circumferential surface 47 is formed in a larger diameter than a sliding inner peripheral surface 49 of the valve housing 40 in sliding contact with the respective lands 60, 62 and 64 of the spool valve element 50 during shifting movement thereof. Accordingly, the cylindrical space is defined to form the damper oil chamber 72 between the inner circumferential surface 47 and the third land 64 by an extent in which the inner circumferential surface 47 is larger in diameter than the sliding inner circumferential surface 49.

The restricting section 74 includes a restriction ring 76, provided on the spool valve element 50 and having a diameter larger than the third land 64 of the spool valve element 50, and an opposite inner circumferential surface 48 formed on the inner circumferential surface 47 of the valve housing 40 in an area opposing to the restriction ring 76 in a radial direction thereof. The restricting section 74, formed in such a structure, has a restriction flow passage 78 through which working oil flows into or flows out of the damper oil chamber 72 in path between the restriction ring 76 and the opposite inner circumferential surface 48. The restriction ring 76 is formed in a nearly cylindrical shape and has a sidewall and an annular plate-like bottom surface contiguous with an edge portion of the sidewall in an area closer to the spool valve element 50 and having the same outer diameter as the sidewall. Further, the spool valve element 50 has an axial end, closer to the return spring 54, which is formed with a mounting portion 65 smaller in diameter than the third land 64 of the spool valve element 50. The restriction ring 76 has a bottom surface having an inner circumferential surface at which the mounting portion 65 is fixedly secured. Therefore, the return spring 54 has an end portion, facing the spool valve element 50, which is held in abutting engagement with the bottom surface of the restriction ring 76 in a manner to be accommodated in the restriction ring 76. Accordingly, the urging force $F_s$ of the return spring 54 acts on the spool valve element 50 via the restriction ring 76. Furthermore, the restricting flow passage 78 is formed on an outer circumferential surface of the restriction ring 76, i.e., in an area between the sidewall and the opposite inner circumferential surface 48 of the valve housing 40. In addition, although the restriction ring 76 may be fitted to the mounting portion 65 to be fixedly secured by the mounting portion 65, the restriction ring 76 may be fixedly secured to the spool valve element 50 by the action of the urging force $F_s$ of the return spring 54 under a state fitted to the mounting portion 65.

With the damper section 70 formed in such a structure, during shifting movement of the spool valve element 50, working oil is caused to flow into or flows out of the damper oil chamber 72 via the restricting flow passage 78. This causes resistance (braking effect) to be applied to the spool valve element 50 in proportion to, for instance, a speed. This absorbs (attenuates or suppresses) the oscillation of the spool valve element 50 during control of the flow rate Q. Even though the oscillation of the spool valve element 50 is suppressed, on the contrary, a drop occurs in responsiveness during control of the flow rate Q. That is, the responsiveness and the suppression of oscillation occurring during shifting movement of the spool valve element 50 are contradictory and incompatible.

With the linear solenoid valve 10 of the present embodiment, meanwhile, the flow of working oil passing through the control port 44 is reversed in direction at a boundary of the null point N. Then, it is considered that the spool valve element 50 is likely to oscillate or less likely to oscillate depending on the direction in which working oil flows through the control port 44, i.e., depending on the shift position of the spool valve element 50. Therefore, if the restricting flow passage 78 is provided in a single uniform way in spite of the shift position assumed by the spool valve element 50 with the emphasis on, for instance, oscillation absorbing capability; it is likely for such a restricting action to cause a drop in responsiveness even in the presence of such a shift position less susceptible to the occurrence of oscillation. On the contrary, if the restricting flow passage 78 is provided in a single uniform way in spite of the shift position of the spool valve element 50 with the emphasis on, for instance, the responsiveness, it is likely to be difficult to appropriately suppress the oscillation of the spool valve element 50 at the shift position susceptible to the occurrence of oscillation.

To address such likelihoods, the present embodiment contemplates the provision of the linear solenoid valve 10 formed in in structure to appropriately ensure an oscillation suppressing effect for the spool valve element 50 depending on needs while minimizing a region (that is, the operating region of the spool valve element 50) of the spool valve element 50 causing a deterioration to the responsiveness during shifting movement of the spool valve element 50. That is, in the shift position of the spool valve element 50 when the spool valve element 50 is less susceptible to the occurrence of oscillation, the drop in responsiveness is suppressed with a priority to the operation of suppressing the oscillation of the spool valve element 50. In the shift position of the spool valve element 50 in an area susceptible to the occurrence of oscillation, on the contrary, the oscillation of the spool valve element 50 is suppressed with a priority to the operation of suppressing the drop in responsiveness. Therefore, the restricting section 74 of the present embodiment has the restricting flow passage 78 different in communicating cross-sectional area for working oil to flow into or flow out of the damper oil chamber 72 depending on a difference in the shift position of the spool valve element 50.

With the linear solenoid valve 10 of the present embodiment, more particularly, the control port 44 stands in a valve inflow stream during a flow control mode of working oil when working oil, delivered from the hydraulic equipment, is input to the control port 44 to be discharged from the drain port 46 via the drain oil passage 68. This results in adverse affect on, for instance, the oscillation of the spool valve element 50 with a large magnitude in the oscillation of the spool valve element 50. That is, with the linear solenoid valve 10 of the present embodiment, the oscillation of the spool valve element 50 becomes large when the shift position of the spool valve element 50 is a position for a flow of working oil from the control port 44 to the drain port 46, i.e. the shifting amount X varies from zero to the null point N, i.e., in the first operating region of the spool valve element 50. On the contrary, during another flow control mode of working oil when working oil, input to the supply port 42, is output from the control port 44 to hydraulic equipment discussed above via the supply oil passage 66, the control port 44 stands in a valve outflow steam. This results in a more favorable effect for, for instance, the oscillation of the spool valve element 50, causing the spool valve element 50 to oscillate at a lower magnitude than that occurring in the valve inflow stream. That is, the linear solenoid valve 10 of the present embodiment allows the spool valve element 50 to be less in degree of oscillation than that occurring in the first operating region of the spool valve element 50 when the spool valve element 50 assumes the shift position in which working oil flows from the supply port 42 to the control port 44, i.e., in the second operating region of the spool valve element 50 in which the shifting amount X varies from the null point N to the maximum shifting amount Xmax. That is, the first operating region represents an operating region, among the shifting strokes of the spool valve element 50, in which the oscillation of the spool valve element 50 becomes large. The second operating region represents an operating region, among the shifting strokes of the spool valve element 50, in which the oscillation of the spool valve element 50 becomes less than that occurring in the first operating region. Therefore, when the spool valve element 50 falls in the first operating region, the restricting section 74 forms the restricting flow passage 78 to be smaller in flowing cross-sectional area than that appearing when the spool valve element 50 remains in the second operating region. For instance, the restricting section 74 forms a first restricting flow passage 78a in the first operation region in the presence of a large oscillation of the spool valve element 50. A second restricting flow passage 78b is formed in a larger flowing cross-sectional area than that of the first restricting flow passage 78a in the second operating region of the spool valve element 50 when oscillation of the spool valve element 50 is small.

Figure 4:
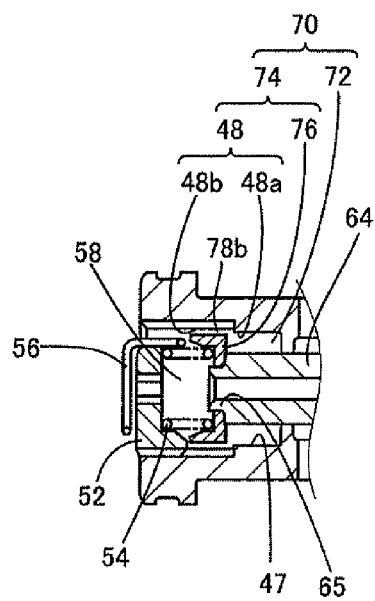
FIG. 4 is a fragmentary cross-sectional view showing an area in which the spring oil chamber is formed in the valve section in FIG. 1 and represents a view illustrating a ease in which the spool valve element assumes the second operating region.
Figure 5:
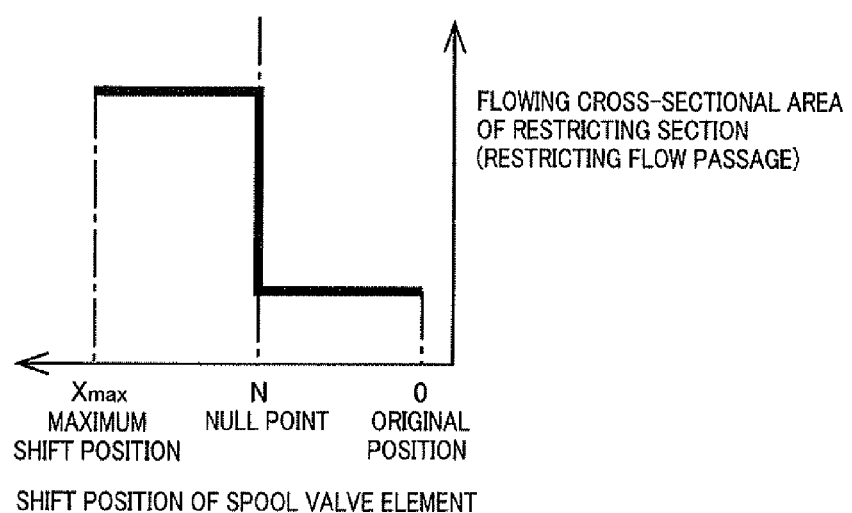
FIG. 5 is a graph showing a relationship of a shifting amount of the spool valve element and a flowing cross-sectional area of the restricting flow passage in the linear solenoid valve

More particularly, FIG. 4 is a fragmentary cross-sectional view showing an area in which the spring oil chamber 58 is formed in the valve section 14 and represents a view illustrating a case in which the spool valve element 50 assumes the second operating region. In FIGS. 1 and 4, the opposite inner peripheral surface 48 of the valve housing 40 includes a first opposite inner peripheral surface 48a, formed in an area facing the returning direction, and a second opposite inner peripheral surface 48b formed in the other area facing the one direction noted above to be larger in diameter than the first opposite inner peripheral surface 48a. The first opposite inner peripheral surface 48a and the second opposite inner peripheral surface 48b are formed such that: when the shift position of the spool valve element 50 assumes a position from zero to an area less than the null point N, at least a part of the first opposite inner peripheral surface 48a belongs to a position in opposition to an outer circumferential surface of the restriction ring 76 in a direction perpendicular to the center axis; and, when the shift position of the spool valve element 50 lies at the null point N, even the part of the first opposite inner peripheral surface 48a does not belong to the position in opposition to the outer circumferential surface of the restriction ring 76 in the direction perpendicular to the center axis. With the first opposite inner peripheral surface 48a and the second opposite inner peripheral surface 48b formed in such structures, the restricting section 74 forms the first restricting flow passage 78a between the restriction ring 76 and the first opposite inner peripheral surface 48a as shown in FIG. 1 when the spool valve element 50 assumes the first operating region. As shown in FIG. 4, further, the restricting section 74 forms the second restricting flow passage 78b between the restriction ring 76 and the second opposite inner peripheral surface 48b when the spool valve element 50 is in the second operating region. The flowing cross-sectional area of the second restricting flow passage 78b is larger than that of the first restricting flow passage 78a. Thus, as shown in FIG. 5, the restricting flow passage 78 has a lessened flowing cross-sectional area in the first operating region of the spool valve element 50 and, furthermore, the restricting flow passage 78 has an increasing flowing cross-sectional area in the second operating region of the spool valve element 50 at the null point N.

With the present embodiment as set forth above, the linear solenoid valve 10 has the valve housing 40 in which the damper oil chamber 72 and the restricting section 74 are provided. With the restricting section 74, the restricting flow passage 78 is formed in different flowing cross-sectional areas through which working fluid flows into or flows out of the damper oil chamber 72 depending on a difference in the shift position of the spool valve element 50. This suppresses the oscillation of the spool valve element 50 owing to the damper oil chamber 72 and the restricting section 74. In addition, flow resistance (flow rate) of the damper oil chamber 72 is altered depending on the shift position of the spool valve element 50. That is, the spool valve element 50 has low responsiveness during shifting movement of the spool valve element 50 depending on the shift position with an increase in an oscillation suppressing effect of the spool valve element 50. Moreover, although the spool valve element 50 has a decreasing oscillation suppressing effect on the spool valve element 50, a drop in responsiveness of the spool valve element 50 during shifting movement of the spool valve element 50 can be suppressed. Consequently, it becomes possible to have a compatibility between responsiveness of the spool valve element 50 during shifting movement thereof and suppressive oscillation (oscillation-proof) of the spool valve element 50 when subjected to a likelihood susceptible to oscillation of the spool valve element 50 and a likelihood less susceptible to oscillation of the spool valve element 50 depending on the shift position of the spool valve element 50. Thus, this decreases the moving range of the spool valve element 50, sacrificing responsiveness of the spool valve element 50 during shifting movement thereof, to be as small as possible, while appropriately ensuring the oscillation suppressing effect of the spool valve element 50 depending on needs.

According to the present embodiment, further, with the spool valve element 50 assuming the shift position susceptible to the increasing oscillation, the restricting section 74 forms the restricting flow passage 78 in smaller flowing cross-sectional surface than that occurring when assuming the shift position at which the spool valve element 50 has a decreasing rate of oscillation. With such an arrangement, when the spool valve element 50 remained in the shift position at which the spool valve element 50 is likely to oscillate, the restricting section 74 increases flow resistance (flow rate) of working oil admitted to the damper oil chamber 72. This appropriately suppresses the oscillation of the spool valve element 50. When the spool valve element 50 remained in the shift position at which the spool valve element 50 is less likely to oscillate, the restricting section 74 decreases flow resistance (flow rate) of working oil admitted to the damper oil chamber 72, thereby suppressing a drop in responsiveness during the shifting movement of the spool valve element 50.

With the present embodiment, furthermore, when, among the shifting strokes of the spool valve element 50, assuming the operating region in which the oscillation increases, the restricting section 74 forms the first restricting flow passage 78a. In contrast, when, among the shifting strokes of the spool valve element 50, assuming the operating region in which the oscillation decreases, the restricting section 74 forms the second restricting flow passage 78b larger in flowing cross-sectional area than that attained in the first restricting flow passage 78a. With such an arrangement, when the spool valve element 50 assumes the operating region liable to oscillate, the first restricting flow passage 78a, formed by the restricting section 74, increases flow resistance (flow rate) of working oil admitted to the damper oil chamber 72 such that the oscillation of the spool valve element 50, is appropriately suppressed. When the spool valve element 50 assumes the other operating region less likely to oscillate, the second restricting flow passage 78b, formed by the restricting section 74, decreases flow resistance (flow rate) of working oil admitted to the damper oil chamber 72 to a level lower than that attained in the first restricting flow passage 78a. This suppresses a drop in responsiveness during the shifting movement of the spool valve element 50.

With the present embodiment, moreover, the damper oil chamber 72 has the cylindrical space formed between the spool valve element 50 and the inner circumferential surface 47 of the valve housing 40. With such an arrangement, no need arises for a specified area to be provided for the damper oil chamber 72 and the damper oil chamber 72 can be simply formed in the valve housing 40.

With the present embodiment, besides, the restricting section 74 is comprised of the restriction ring 76, provided on the spool valve element 50 and having a diameter larger than the spool valve element 50, and the portions (opposite inner circumferential surface 48) including the inner circumferential surface 47 of the valve housing 40 and facing the restriction ring 76 in radial direction thereof. With such an arrangement, the restricting section 74, available to suppress the inflow and outflow of working fluid to and from the damper oil chamber 72, can be simply formed in the valve housing 40. That is, the restricting flow passage 78, available to pass working fluid to flow into or out of the damper oil chamber 72, can be simply formed in the valve housing 40.

With the present embodiment, in addition, the damper oil chamber 72 and the restricting section 74, that is, the damper section 70 is formed in the spring oil chamber 58 in which the return spring 54 is located. With such an arrangement, no need arises for specified areas to be provided for the damper section 70 and the damper section 70 can be simply formed in the valve housing 40.

With the present embodiment, further, the valve housing 40 includes: the supply port 42 through which working fluid is supplied; the drain port 46 through which working fluid is drained; and the control port 44 through which working fluid outflows and inflows. Thus, the spool valve element 50 provides flow communication between the drain port 46 and the control port 44 in the first operating region between the neutral point of the shifting stroke of the spool valve element 50 and ending at the terminal end (original position) of the shifting stroke; while providing flow communication between the supply port 42 and the control port 44 in the second operating region between the neutral point of the shifting stroke of the spool valve element 50 and ending at the other terminal end (the maximum shift position) of the shifting stroke. With the spool valve element 50 placed in the first operating region, the restricting section 74 allows the restricting flow passage 78 to have the smaller flowing cross-sectional area than that appearing in the second operating region. With such an arrangement, when the spool valve element 50 assumes, for instance, the first operating region liable to cause the occurrence of oscillation, the restricting section 74 causes flow resistance (flow rate) of working oil admitted to the damper oil chamber 72 to increase such that the oscillation of the spool valve element 50 is appropriately suppressed, When the spool valve element 50 assumes, for instance, the second operating region less liable to cause the occurrence of oscillation, the restricting section 74 causes flow resistance (flow rate) of working oil admitted to the damper oil chamber 72 to decrease, thereby suppressing a drop in responsiveness of the spool valve element 50 during shifting movement thereof.

With the present embodiment, furthermore, the damper oil chamber 72 includes a cylindrical space formed between the axial end portion (third land 64) of the spool valve element 50 disposed in the spring oil chamber 58 and the valve housing 40; and the restricting section 74 is comprised of the restriction ring 76, larger in diameter than the third land 64, and the opposite inner circumferential surface 48 forming the inner circumferential surfaces 47 of the valve housing 40 and facing the restriction ring 76 in the radial direction thereof. This allows the linear solenoid valve 10 has no need to prepare specified areas for the damper oil chamber 72 and the restricting section 74 can be simply formed in the spring oil chamber 58.

With the present embodiment, moreover, the damper oil chamber 72 includes a cylindrical space formed in the spring oil chamber 58 between an axial end portion (third land 64) of the spool valve element 50 and the inner circumferential surface 47 of the valve housing 40. The inner circumferential surface 47 is formed in size larger in diameter than the sliding inner circumferential surface 49 of the valve housing 40 in sliding engagement with the respective lands 60, 62 and 64 of the spool valve element 50 during shifting movement thereof. With such an arrangement, a cylindrical space is appropriately formed to serve as the damper oil chamber 72 between the inner circumferential surface 47 and the third land 64 by an extent in that the inner circumferential surface 47 is greater in diameter than the sliding inner circumferential surface 49.

With the present embodiment, besides, the restricting section 74 forms the first restricting flow passage 78a between the restriction ring 76 and the first opposite inner circumferential surface 48a of the opposite inner circumferential surface 48 when the spool valve element 50 assumes the first operating region. The restricting section 74 forms the second restricting flow passage 78b between the restriction ring 76 and the second opposite inner circumferential surface 48b, greater in diameter than the first opposite inner circumferential surface 48a, of the opposite inner circumferential surface 48 when the spool valve element 50 assumes the second operating region, where the flowing cross-sectional area of the second restricting flow passage 78b is larger than that of the first restricting flow passage 78a. With such an arrangement, when the spool valve element 50 is in, for instance, the first operating region liable to cause the occurrence of oscillation, the first restricting flow passage 78a, formed in the restricting section 74, causes oil resistance (flow rate) of working fluid admitted to the damper oil chamber 72 to increase when the oscillation of the spool valve element 50 is reduced suitably. In contrast, when the spool valve element 50 is in, for instance, the second operating region less liable to cause the occurrence of oscillation, the second restricting flow passage 78b, formed in the restricting section 74, causes oil resistance (flow rate) of working fluid admitted to the damper oil chamber 72 to decrease, thus a drop in responsiveness is suppressed during the shifting movement of the spool valve element 50. In addition, the first restricting flow passage 78a and the second restricting flow passage 78b are simply defined with the first opposite inner circumferential surface 48a and the second opposite inner circumferential surface 48b within spring oil chamber 58.

In the foregoing, while the present invention has been described in detail with reference to the embodiment shown in the accompanying drawings, the present invention may be applied in other modes.

The embodiment, set forth above, has been arranged such that, for instance, the oscillation of the spool valve element 50 increases when the control port 44 has the valve inflow stream and, when the control port 44 has the valve outflow stream, the oscillation of the spool valve element 50 becomes lower than that occurring when placed in the valve inflow stream. However, such an arrangement may be conceivably altered in a reverse mode. For such a case, the opposite inner circumferential surface 48 of the valve housing 40 may be arranged to include, for instance, the first opposite inner circumferential surface 48a, formed in an area facing the one direction noted above, and the second opposite inner circumferential surface 48b formed in another area facing the returning direction with a diameter being larger than that of the first opposite inner circumferential surface 48a. In such a case, moreover, the first opposite inner circumferential surface 48a and the second opposite inner circumferential surface 48b are formed so as to vary the flowing cross-sectional area of the restricting flow passage 78 with a boundary on, for instance, the null point.

With the embodiment set forth above, further, the damper section 70 is formed inside the spring oil chamber 58 but may be provided in another area of the linear solenoid valve 10. For instance, the damper section 70 may be formed in a space inside the core member 20 in which the shaft 26 and the spool valve element 50 are held in abutting contact with each other.

Figure 3A:
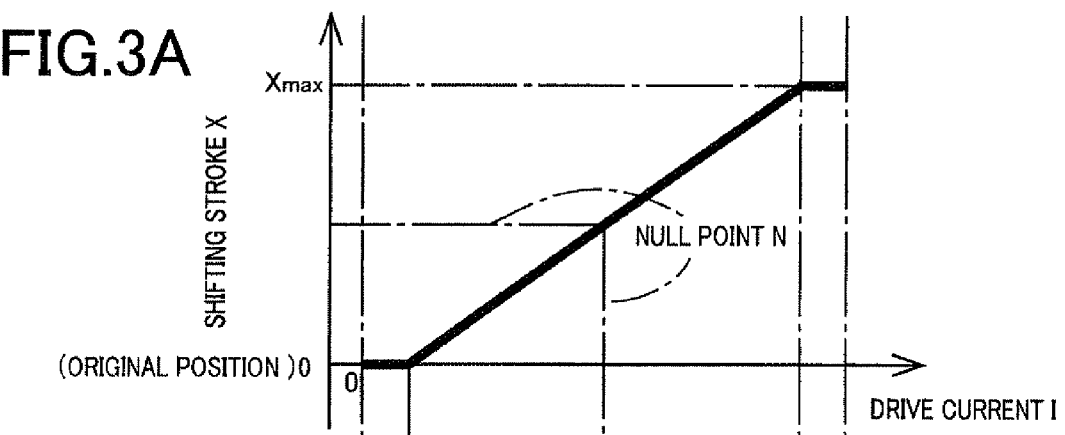
FIG. 3A is a graph showing a relationship of a drive current supplied to the linear solenoid and a shifting amount of the spool valve element in the linear solenoid valve in FIG. 1
Figure 3B:
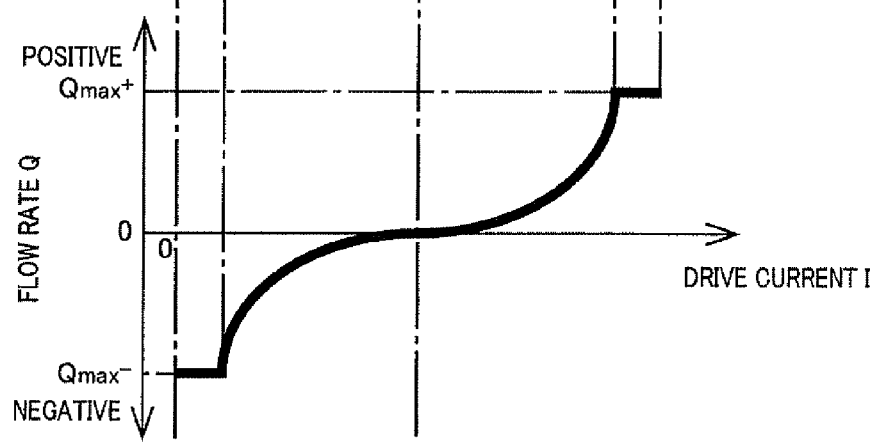
FIG. 3B is a graph showing a relationship of a drive current and a flow rate of working oil passing through the control port.

With the embodiment set forth above, furthermore, the shifting amount X of the spool valve element 50 is arranged to vary in proportion to the drive current I applied to the linear solenoid 18 as shown in FIG. 3A but may be arranged not to vary in proportion to the drive current I even though the flow rate Q of working oil flowing through the control port 44 varying in a pattern with the same tendency to gradually increase as shown in FIG. 3B. This results from influences such as hydrodynamic forces of working oil passing through the various ports 42, 44 and 46 and respective oil passages 66 and 68. Altering shapes of the various ports 42, 44 and 46 and the respective oil passages 66 and 68 at corner portions thereof etc., makes it possible to allow the drive current I and the flow rate Q to have a relationship diagram varying in a linear pattern as shown in FIG. 3A.

Moreover, the mounting portion 65 of the spool valve element 50, to which the restriction ring 76 is fitted, has the diameter smaller than the third land 64, but no need arises to necessarily have a small diameter and, in alternative, the mounting portion 65 may have the same diameter as, for instance, the third land 64 or may have a large diameter. That is, various modes can be employed as long as the restriction ring 76 is fitted. Further, the spool valve element 50 can be provided with the restriction ring 76 as one component.

Besides, a whole of or a part of the spool valve element 50 may be made of metal such as copper alloy or the like or may be made of ferromagnetic body. In addition, a whole of or a part of the valve housing 40 may be made of metal such as copper alloy or the like or may be made of ferromagnetic body. Here, "ferromagnetic body" refers to, for instance, iron (pure iron), nickel, cobalt and an alloy or oxides containing these elements.

With the present embodiment set forth above, further, the lid body 52 has the returning direction side protruding in a cylindrical shape with an inner diameter made greater than an outer diameter of the return spring 54 so as to surround the return spring 54 but no need arises for such a shape to protrude.

With the present embodiment set forth above, furthermore, the present invention has been described with reference to the linear solenoid valve 10 for the vehicle with the object to perform flow control of working oil in an exemplary case. However, the present invention may not be applied to the hydraulic equipment but even to a linear solenoid valve of, for instance, pneumatic equipment. That is, the present invention may have such application provided that the linear solenoid valve includes a spool valve element fitted in a valve housing which can move reciprocatingly in an axis and takes the form of a linear type flow control valve arranged to control the flow rate of working fluid (such as gas, liquid) depending on the shift position of the spool valve element. Moreover, the present invention is not limited to the valve in use only for the vehicle.

While the invention described be considered only as illustrative of the embodiment, the present invention can be implemented in various modifications and improvements based on knowledge of those skilled in the art.

NOMENCLATURE OF ELEMENTS

10: linear solenoid valve (flow control valve, electromagnetic valve)
18: linear solenoid
40: valve housing
42: supply port
44: control port
46: drain port
47: inner circumferential surface
48: opposite inner circumferential surface (opposite portion)
48a: first opposite inner peripheral surface
48b: second opposite inner peripheral
49: sliding inner peripheral surface
50: spool valve element
54: return spring
58: spring oil chamber (spring chamber)
60: first land
62: second land 64: third land (shaft end portion)
72: damper oil chamber (damper chamber)
74: restricting section
76: restriction ring
78: restriction flow passage
78a: first restricting flow passage
78b: second restricting flow passage

The invention claimed is:
1. A linear type flow control valve comprising:
a spool valve element fitted in a valve housing for reciprocating movement capability along one axis for controlling a flow rate of working fluid depending on a shift position of the spool valve element;
a linear solenoid driving the spool valve element in one direction along the one axis in response to an action of an electromagnetic force; and
a return spring urging the spool valve element in a returning direction opposite to the one direction, wherein:
the flow control valve has a characteristic of an output flow rate such that a positive output flow rate increases after a negative output flow rate decreases toward zero and the output flow is zero at a neutral point with an increase of a shifting stroke of the spool valve element;
the flow control valve includes a damper chamber, variable in volume depending on shifting movement of the spool valve element, a spring chamber in which the return spring is disposed, and a restricting section for controlling an inflow and an outflow of working fluid into or out of the damper chamber in the valve housing;
the restricting section forms a restricting flow passage having a larger flowing cross-sectional area of the working fluid when the spool valve element assumes a shift position on a positive output flow rate side of the neutral point of the spool valve element than that when the spool valve element assumes a shift position on a negative output flow rate side;
the damper chamber is only between a surface of the restricting section abutting the spool valve element and a surface of the valve housing; and
the surface of the valve housing is perpendicular to a longitudinal axis of the spool valve element and is between the restricting section and the linear solenoid.

2. The flow control valve according to claim 1, wherein when the spool valve element assumes the shift position on the negative output flow rate side of the shifting stroke of the spool valve element at which the spool valve element oscillates with large amplitude, the restricting section allows the restricting flow passage to have a smaller flowing cross-sectional area than that occurring when assuming the shift position on the positive output flow rate side in oscillation with small amplitude.

3. The flow control valve according to claim 2, wherein:
the damper chamber is provided in a cylindrical space formed between the restricting section, the spool valve element and an inner circumferential surface of the valve housing.

4. The flow control valve according to claim 2, wherein:
the restricting section comprises a restriction ring, provided on the spool valve element and having a diameter larger than that of the spool valve element, and a portion of an inner circumferential surface of the valve housing in an area placed in opposition to the restriction ring in a radial direction.

5. The flow control valve according to claim 1, wherein:
the restricting section forms:
a first restricting flow passage in the shift position on the negative output flow rate side, of the shifting stroke of the spool valve element, at which an amplitude of the oscillation of the spool valve element becomes large; and
a second restricting flow passage in the shift position on the positive output flow rate side, of the shifting stroke of the spool valve element, at which the amplitude of the oscillation of the spool valve element becomes small, wherein a flowing cross-sectional area of the second restricting flow passage is larger than that of the first restricting flow passage.

6. The flow control valve according to claim 5, wherein:
the damper chamber is provided in a cylindrical space formed between the restricting section, the spool valve element, and an inner circumferential surface of the valve housing.

7. The flow control valve according to claim 5, wherein:
the restricting section comprises a restriction ring, provided on the spool valve element and having a diameter larger than that of the spool valve element, and a portion of an inner circumferential surface of the valve housing in an area placed in opposition to the restriction ring in a radial direction.

8. The flow control valve according to claim 1, wherein:
the damper chamber is provided in a cylindrical space formed between the restricting section, the spool valve element, and an inner circumferential surface of the valve housing.

9. The flow control valve according to claim 8, wherein:
the restricting section comprises a restriction ring, provided on the spool valve element and having a diameter larger than that of the spool valve element, and a portion of an inner circumferential surface of the valve housing in an area placed in opposition to the restriction ring in a radial direction.

10. The flow control valve according to claim 1, wherein:
the restricting section comprises a restriction ring, provided on the spool valve element and having a diameter larger than that of the spool valve element, and a portion of an inner circumferential surface of the valve housing in an area placed in opposition to the restriction ring in a radial direction.

11. The flow control valve according to claim 1, wherein:
the valve housing includes:
a supply port through which the working fluid is supplied;
a drain port through which the working fluid is drained; and
a control port through which the working fluid outgoes and inflows; wherein
the spool valve element causes the drain port and the control port to communicate with each other when the spool valve is in a first operating region between the neutral point of the shifting stroke and one end of the shifting stroke with the negative output flow rate;
the spool valve element causes the supply port and the control port to communicate with each other when the spool valve is in a second operating region between the neutral point and the other end of the shifting stroke with the positive output flow rate; and
wherein when the spool valve element is in the first operating region, the restricting section allows the restricting flow passage to have a flowing cross-sectional area lower than that occurring when the spool valve element is in the second operating region.

12. The flow control valve according to claim 11, wherein:
the damper chamber is provided in a cylindrical space formed between an axial end portion of the spool valve element disposed in the spring chamber, and the valve housing; and
the restricting section comprises a restriction ring, larger in diameter than the axial end portion of the spool valve element, and an opposite inner circumferential surface of inner circumferential surfaces of the valve housing placed in opposition to the restriction ring in a radial direction.

13. The flow control valve according to claim 12, wherein the damper chamber is provided in the cylindrical space formed between the axial end portion of the spool valve element and the inner circumferential surface of the valve housing, and wherein the inner circumferential surface has a diameter larger than a sliding inner circumferential surface of the valve housing held in sliding engagement with a land of the spool valve element during shifting movement of the spool valve element.

14. The flow control valve according to claim 12, wherein:
when the spool valve element is in the first operating region, the restricting section forms a first restricting flow passage between the restriction ring and a first opposite inner circumferential surface of the opposite inner circumferential surfaces; and
when the spool valve element is in the second operating region, the restricting section forms a second restricting flow passage, having a flowing cross-sectional area greater than that of the first restricting flow passage, between the restriction ring and a second opposite inner circumferential surface of the opposite inner circumferential surfaces having a diameter larger than the first opposite inner circumferential surface.

* * * * *